Aug. 20, 1935.  J. MERCIER  2,012,049

PISTON

Filed Dec. 26, 1934

Jean Mercier
INVENTOR his ATTY.

Patented Aug. 20, 1935.

2,012,049

UNITED STATES PATENT OFFICE 2,012,049

PISTON

Jean Mercier, Neuilly-sur-Seine, France

Application December 26, 1934, Serial No. 759,205
In France January 9, 1934

5 Claims. (Cl. 309—4)

The present invention has for its object a stuffing-box of the type in which a fluid, and preferably a liquid, is maintained under pressure between two scraping caps having cutting flanges which are turned towards each other and are applied against the surface, thus forming a packing device between two mediums which are under different pressures.

The invention is chiefly characterized by the fact that a membrane subject to deformation separates the said fluid from the one of the two mediums, which is subjected to the greater pressure, and that it transmits to this fluid the pressure of the said medium.

Due to this arrangement, no leakage can occur from the medium having the greater pressure, to the medium having the lower pressure, the question of leakless conditions being transferred to the fluid which forms the stuffing-box, and which may be so chosen that it will possess the proper qualities, such as surface tension, viscosity, chemical neutrality, etc.

Figure 1:
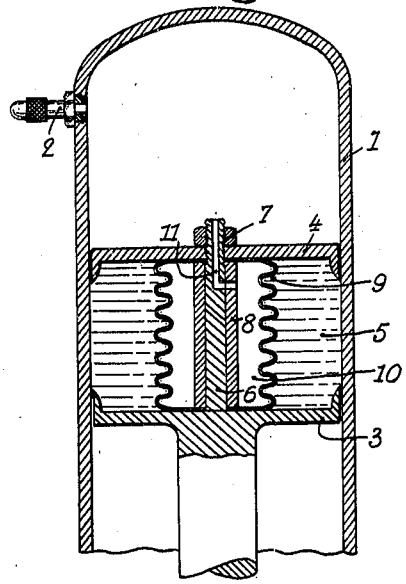
Figure 2:
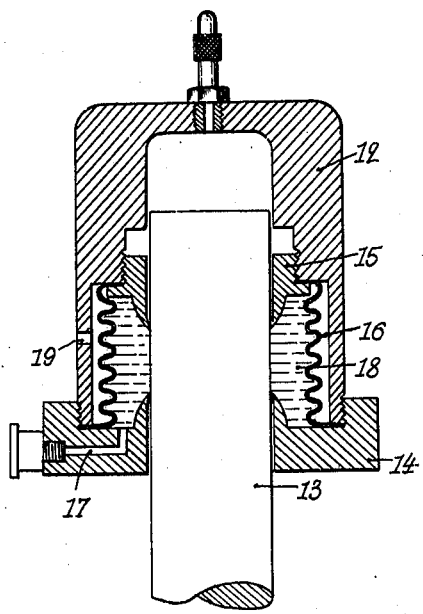
Figure 3:
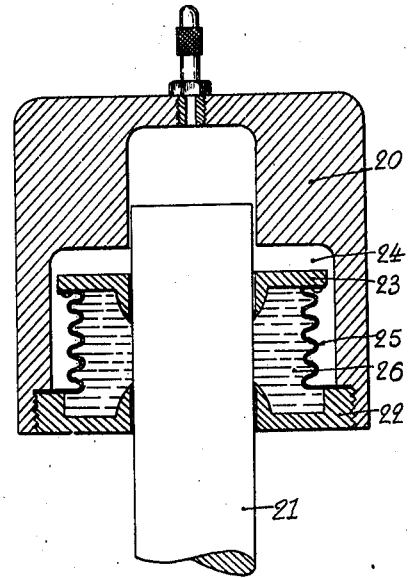

Figs. 1, 2, and 3 of the accompanying drawing represent, by way of example, three forms of execution of the object of the invention, in longitudinal section.

In the form of execution shown in Fig. 1, it is desired to maintain in a cylinder 1 a compressed fluid such as air, for example, which has been admitted into said cylinder through a valve 2. The leakless packing device consists of two scraping caps 3 and 4, preferably metallic, between which there is maintained a fluid 5 consisting, for example, of grease. A rod 6, secured to the cap 3, traverses an aperture in the disc 4 and is terminated by a threaded part upon which is screwed a nut 7. A sleeve 8 serves to hold between said sleeve and the caps 3 and 4 a membrane 9 subject to deformation, of leather, for example, which forms around the sleeve 8 an air-chamber 10. A conduit 11, provided in the rod 6 and in the sleeve 8, establishes a permanent communication between the cylinder 1 and the chamber 10, and thus the compressed air in the cylinder 1 enters the chamber 10 and imparts to the fluid 5, through the intermediary of the membrane subject to deformation 9, a pressure which is greater according as the air is more strongly compressed. The fluid is thus pressed energetically against the walls of the cylinder 1, and leakless conditions are obtained even if the device should be inverted in such way that the cylinder is directed downwardly and the leakless packing upwardly. Furthermore, no mixing is possible between the gas and the grease, and no emulsion can be formed.

The scraping caps prevent leakage of grease, and as they are turned towards each other, their sharp edges will recover the deposits of grease formed on the walls during the alternate movement of the piston, and thus the consumption of grease is insignificant.

In the example shown in Fig. 2, it is desired to maintain a vacuum in the interior of the cylinder 12, by preventing the admission of the external air into said cylinder, in which is slidable a piston 13. The leakless packing consists of two scraping caps 14 and 15, screwed to the walls of the cylinder 12. A membrane subject to deformation 16, is held between the caps 14 and 15 and the walls of the cylinder, and thus a chamber 18 is formed between the membrane subject to deformation 16, the caps 14 and 15, and the piston 13. Any suitable fluid, such as grease, for example, may be introduced into the interior of this chamber 18 through a filling conduit 17 provided in the cap 14. One or more orifices 19, formed in the wall of the cylinder 12, transmit the pressure of the external air to the membrane 16 and hence to the grease contained in the chamber 18, said grease being thus pressed against the piston 13.

In the example shown in Fig. 3, it is desired to maintain in the cylinder 20 a pressure which is greater than the one existing at the exterior of said cylinder. For this purpose, there is mounted between the cylinder 20 and the piston 21, a leakless packing member comprising a first scraping cap 22 screwed to the wall of the cylinder 20, a second scraping cap 23 guided upon the piston 21 and freely movable in a recessed part 24 of the cylinder 20, and lastly, a membrane subject to deformation or a metallic bellows 25, secured to the two caps 22 and 23. A chamber 26 is thus formed between the metallic bellows 25, the two caps 22 and 23, and the piston 21. A fluid such as grease may be introduced into said chamber 26, and the pressure prevailing in the cylinder 20 will be transmitted, through the intermediary of the recess 24, to the metallic bellows 25, and consequently to the fluid contained in the chamber 26, thus strongly pressing this fluid against the piston 21.

It is obvious that the invention is not limited to the examples of execution above described, and that it is possible to make numerous modifications therein without departing from the principle of the invention.

Having now described my invention what I claim as new and desire to secure by Letters Patent is:

1. In combination, a receptacle provided with a bore having a cylindrical surface, a member provided with an external cylindrical surface and having a sliding fit in said bore and adapted to separate the space within said receptacle from the space out of said receptacle, a first cylindrical cutting flange secured to and forming an extension of one of said cylindrical surfaces and adapted to bear on the other cylindrical surface, a second cylindrical cutting flange adapted to bear on said other cylindrical surface, said flanges having their cutting edges turned toward each other, deformable partition means connected with said flanges, whereby a deformable chamber is formed between said partition means and said other cylindrical surface, a fluid in said chamber, and communicating means adapted to establish a communication between the surface of said partition means on the outside of said chamber and one of said spaces within and out of said receptacle.

2. In combination a receptacle provided with a cylindrical bore, a cylindrical piston having a sliding fit in said bore, and adapted to separate the space within said receptacle from the space out of said receptacle, a first cylindrical cutting flange secured to said piston and adapted to bear on said cylindrical bore of said receptacle, a second cylindrical cutting flange also adapted to bear on said cylindrical bore, said flanges having their cutting edges turned towards each other, deformable partition means connected with said piston and with said second flange, whereby a deformable chamber is formed between said partition means and said cylindrical bore, a fluid in said chamber, and communicating means adapted to establish a communication between the surface of said partition means on the outside of said chamber and one of said spaces within and out of said receptacle.

3. In combination a receptacle provided with a cylindrical bore, a cylindrical piston having a sliding fit in said bore and adapted to separate the space within said receptacle from the space out of said receptacle, a first cylindrical cutting flange secured to said receptacle and adapted to bear on said piston, a second cylindrical cutting flange adapted to bear on said piston, said flanges having their cutting edges turned towards each other, deformable partition means connected with said receptacle and with said second flange, whereby a deformable chamber is formed between said partition means and said piston, a fluid in said chamber, and communicating means adapted to establish a communication between the surface of said partition means on the outside of said chamber and one of said spaces within and out of said receptacle.

4. In combination a receptacle provided with a cylindrical bore, a cylindrical piston having a sliding fit in said bore and adapted to separate the space within said receptacle from the space out of said receptacle, a cylindrical cutting flange secured to said piston and adapted to bear on said cylindrical bore of said receptacle, a cylindrical disc provided with a cylindrical cutting flange adapted to bear on said cylindrical bore, said flanges having their cutting edges turned towards each other, connecting means between said piston and said disc adapted to maintain said piston and said disc at a distance from each other, a deformable partition between said piston and said disc and connected with said piston and said disc, whereby a deformable chamber is formed between said partition and said cylindrical bore, a fluid in said chamber, and communicating means adapted to establish a communication between the surface of said partition on the outside of said chamber and one of said spaces within and out of said receptacle.

5. In a combination according to claim 3, the further feature consisting in connecting means adapted to secure said second cutting flange to said receptacle.

JEAN MERCIER.